United States Patent
Nicholson

(10) Patent No.: US 10,038,370 B2
(45) Date of Patent: Jul. 31, 2018

(54) REDUCTION OF ELECTRICAL SIZE OF BULK CAPACITORS IN MOBILE POWER SUPPLIES

(71) Applicant: FAIRCHILD SEMICONDUCTOR CORPORATION, Sunnyvale, CA (US)

(72) Inventor: Richard Nicholson, Sunnyvale, CA (US)

(73) Assignee: FAIRCHILD SEMICONDUCTOR CORPORATION, Phoenix, AZ (US)

( * ) Notice: Subject to any disclaimer, the term of this patent is extended or adjusted under 35 U.S.C. 154(b) by 0 days.

(21) Appl. No.: 15/664,126

(22) Filed: Jul. 31, 2017

(65) Prior Publication Data

US 2018/0091042 A1    Mar. 29, 2018

Related U.S. Application Data

(60) Provisional application No. 62/400,386, filed on Sep. 27, 2016.

(51) Int. Cl.
*H02M 1/44*     (2007.01)
*H02M 1/34*     (2007.01)
*H02M 1/32*     (2007.01)

(52) U.S. Cl.
CPC ........ *H02M 1/44* (2013.01); *H02M 2001/322* (2013.01); *H02M 2001/344* (2013.01)

(58) Field of Classification Search
CPC ............ H02M 1/44; H02M 1/08; H02M 1/14; H02M 1/34; H02M 2001/342; H02M 2001/344; H02M 3/07; H02M 3/335; H02M 1/32; H02M 3/33507; H02M 2001/322
See application file for complete search history.

(56) References Cited

U.S. PATENT DOCUMENTS

| | | | |
|---|---|---|---|
| 5,615,097 A * | 3/1997 | Cross | H02H 7/1252 361/111 |
| 5,666,255 A * | 9/1997 | Muelleman | H02H 9/005 361/111 |
| 2012/0287685 A1 * | 11/2012 | Fahlenkamp | H02M 1/36 363/49 |
| 2012/0313616 A1 * | 12/2012 | Lee | H02M 1/126 323/312 |
| 2013/0342129 A1 * | 12/2013 | Vaughan | H02M 1/14 315/240 |
| 2014/0153301 A1 * | 6/2014 | Wang | G01R 19/175 363/52 |
| 2015/0008755 A1 * | 1/2015 | Sone | H02J 5/005 307/104 |
| 2017/0294831 A1 * | 10/2017 | Dai | G05F 5/00 |
| 2017/0317582 A1 * | 11/2017 | Leong | H02M 3/07 |

* cited by examiner

*Primary Examiner* — Gustavo Rosario Benitez

(57) ABSTRACT

A capacitor input circuit for a mobile power supply includes a bulk capacitor and a switch. The switch connects the bulk capacitor to receive a rectified AC voltage from a rectifier when an AC line voltage input to the mobile power supply is lower than a threshold voltage. When the AC line voltage is greater than the threshold voltage, the switch electrically floats the bulk capacitor.

13 Claims, 3 Drawing Sheets

REDUCTION OF ELECTRICAL SIZE OF BULK CAPACITORS IN MOBILE POWER SUPPLIES

CROSS-REFERENCE TO RELATED APPLICATION

This application claims the benefit of U.S. Provisional Application No. 62/400,386, filed on Sep. 27, 2016, which is incorporated herein by reference in its entirety.

BACKGROUND OF THE INVENTION

1. Field of the Invention

The present invention relates generally to electrical circuits, and more particularly but not exclusively to mobile power supplies.

2. Description of the Background Art

Mobile devices, such as smartphones and tablets, are powered by mobile power supplies that are plugged into an alternating current (AC) outlet. As its name implies, a mobile power supply is relatively small and portable. A travel power adapter is a mobile power supply that is configured to receive a wide range of input AC line voltages to allow for use in different countries. Unlike other power supplies, physical size is an important consideration for a travel power adapter.

Embodiments of the present invention allow for reduction of the electrical size (i.e., electrical characteristics, such as capacitance value and voltage rating), and thus the corresponding physical size, of bulk capacitors of travel power adapters and other mobile power supplies.

SUMMARY

In one embodiment, a capacitor input circuit for a mobile power supply includes a bulk capacitor and a switch. The switch connects the bulk capacitor to receive a rectified AC voltage from a rectifier when an AC line voltage input to the mobile power supply is lower than a threshold voltage. When the AC line voltage is greater than the threshold voltage, the switch electrically floats the bulk capacitor.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are explained with particular component specifications, such as values, breakdown ratings, types. etc., for illustration purposes. As can be appreciated, other component specifications may also be suitable depending on the particulars of the application.

A travel power adapter includes a rectifier for rectifying an input AC line voltage, a bulk capacitor, and a DC-DC converter. In currently-available 15-65 W travel power adapters, the bulk capacitors have approximately the same physical size as the transformer of the converter. The physical size of a bulk capacitor is significant, considering that a third of the physical size of the travel power adapter is due to the transformer, another third is due to the bulk capacitors, and another third is due to connectors and other components. Worse, as power rating increases, the physical size of the transformer and bulk capacitors also increases and becomes a bigger percentage of the total volume of the travel power adapter. Reducing the physical size of the bulk capacitors can thus significantly improve the power density (i.e., power delivered relative to physical size) of the travel power adapter.

Because bulk capacitors are physically large, and may even be the tallest component on a printed circuit board (PCB), they restrict the form factor of the travel power adapter. Reducing the physical size of bulk capacitors allows for low profile, high power travel power adapters.

Figure 1:
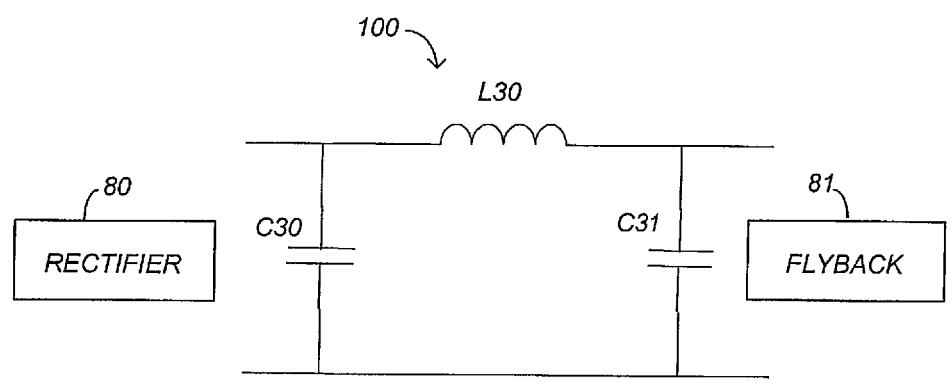
FIG. 1 is a schematic diagram of an example travel power adapter.

FIG. 1 is a schematic diagram of an example travel power adapter. In the example of FIG. 1, the travel power adapter comprises a rectifier 80, a capacitor input circuit 100, and a flyback converter 81. The capacitor input circuit 100 comprises an inductor L30, a capacitor C30, and a capacitor C31. The capacitors C30 and C31 may each have a capacitance of 22 µF and a voltage rating of 400V for a 27 W travel power adapter. The capacitors C30 and 31 serve as bulk capacitors, and the inductor L30 performs electromagnetic interference (EMI) filtering with the capacitors C30 and 31. As bulk capacitors, the capacitors C30 and C31 are rated to hold the input AC line voltage at a minimum level (e.g., 85 VAC, 120V peak) and have a breakdown rating for the maximum AC line voltage (e.g., 270 VAC, 380V peak).

In the example of FIG. 1, the capacitor C30 is across the output of the rectifier 80 (e.g., bridge rectifier). The rectifier 80 rectifies the AC line voltage to a rectified AC voltage. The inductor L30 and the capacitors C31 and C30 form a pi filter. The pi filter smoothes and filters the rectified AC voltage to generate a smoothed rectified AC voltage, which is provided to the flyback converter 81 as an input voltage. The flyback converter 81 converts the input voltage to a regulated output DC voltage of the travel power adapter. Because of the requirement to hold the AC line voltage at a minimum level and have a breakdown rating that can withstand the maximum AC line voltage, the capacitors C30 and C31 are relatively large, both electrically and physically.

Figure 2:
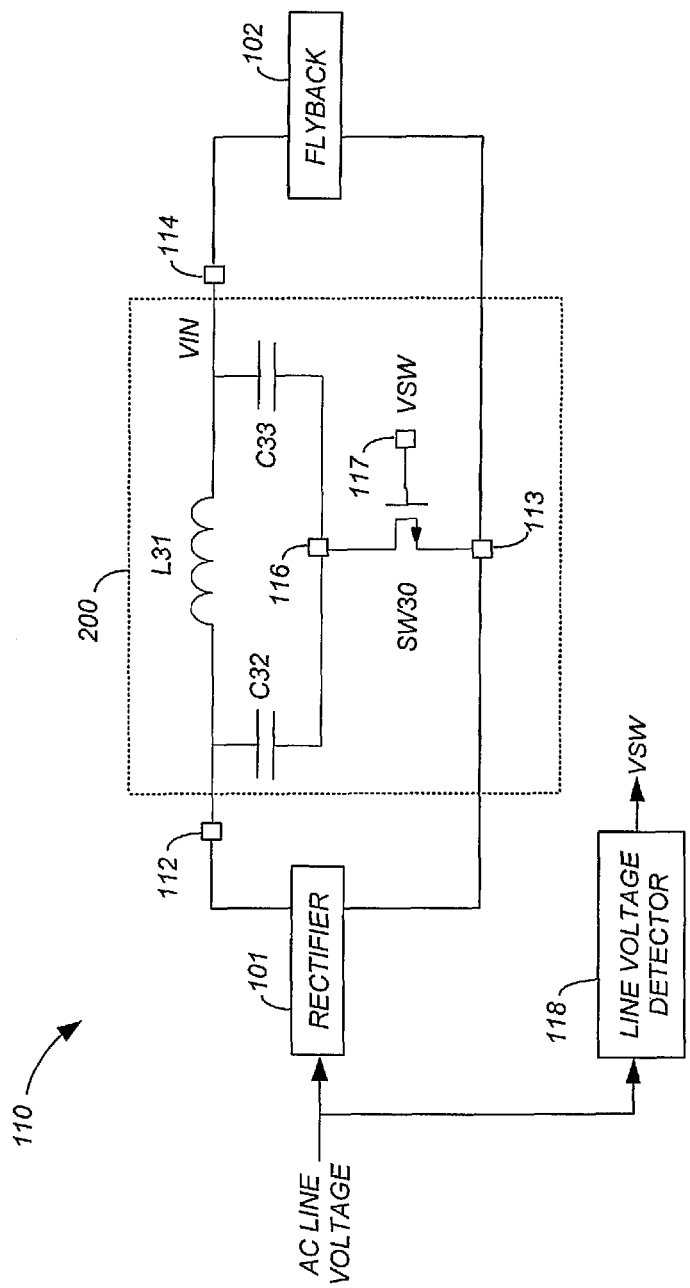
FIG. 2 shows a schematic diagram of a travel power adapter in accordance with an embodiment of the present invention.

FIG. 2 shows a schematic diagram of a travel power adapter 110 in accordance with an embodiment of the present invention. In the example of FIG. 2, the travel power adapter 110 comprises a rectifier 101, a capacitor input circuit 200, and a flyback converter 102.

The rectifier 101 may comprise a bridge rectifier, for example. The rectifier 101 receives an input AC line voltage (e.g., from a wall AC outlet), and rectifies the AC line voltage to a rectified AC voltage that is provided to the capacitor input circuit 200 across the nodes 112 and 113. The capacitor input circuit 200 receives the rectified AC voltage from the rectifier 101, and outputs an input voltage VIN to the flyback converter 102 across the nodes 114 and 113. The node 113 may serve as a ground reference. The flyback converter 102 converts the input voltage VIN to a regulated output DC voltage of the travel power adapter 110. The flyback converter 102 may be a buck-boost converter, for example.

In the example of FIG. 2, the capacitor input circuit 200 comprises an inductor L31, bulk capacitors C32 and C33, and a switch SW30. In one embodiment, the switch SW30 is a metal oxide semiconductor field effect transistor (MOSFET).

In the example of FIG. 2, a first end of the inductor L31 is connected to a first end of the bulk capacitor C32, and a second end of the inductor L31 is connected to a first end of the bulk capacitor C33. A second end of the bulk capacitor C32 is connected to a second end of the bulk capacitor C33. The second ends of the bulk capacitors C32 and C33 are connected to a first electrode (e.g., drain terminal) of the switch SW30 at a node 116, and a second electrode (e.g., source terminal) of the switch SW30 is connected to the node 113. A control electrode of the switch SW30 (e.g., gate terminal) is driven at a node 117 by a switch voltage VSW, which serves as a control signal for controlling a switching operation of the switch SW30.

A line voltage detector 118 may be configured to compare the AC line voltage to a threshold voltage, assert the switch voltage VSW to turn on the switch SW30 when the AC line voltage is less than the threshold voltage, and de-assert the switch voltage VSW to turn off the switch SW30 when the AC line voltage is greater than the threshold voltage. The line voltage detector 118 may be part of the control circuit of the converter 102 or a separate circuit. The line voltage detector 118 is depicted in FIG. 2 as sensing the AC line voltage, i.e., before the rectifier 101. As can be appreciated, another voltage that is indicative of the AC line voltage, such as the rectified AC voltage output of the rectifier 101, input voltage VIN to the flyback converter 102, an auxiliary voltage on an auxiliary winding of a transformer of the converter 102, etc., may also be sensed to detect the AC line voltage. The threshold voltage may be set based on where and how the AC line voltage is sensed, which will depend on the application.

As their name implies, the bulk capacitors C32 and C33 serve as bulk capacitors and, accordingly, are electrically sized to hold-up the input AC line voltage at a minimum level (e.g., 85 VAC, 120V peak). For a 27 W power travel adapter, each of the bulk capacitors C32 and C33 may have a capacitance of 22 µF and a voltage rating of 160V.

In the example of FIG. 2, the bulk capacitors C32 and C33 electrically float at higher input AC line voltages by turning off the switch SW30, thereby preventing breakdown and allowing lower-rated capacitors to be used. That is, the bulk capacitors C32 and C33 may have lower voltage ratings compared to bulk capacitors in conventional designs.

More particularly, in the example of FIG. 2, the switch SW30 is closed only when the AC line voltage input to the travel power adapter 110 is less than a threshold voltage (e.g., 140 VAC). The switch SW30 is open when the AC line voltage is equal to or greater than the threshold voltage, thereby electrically floating the bulk capacitors C32 and C33. The bulk capacitors C32 and C33 are thus connected to ground to insert them in the capacitor input circuit 200 to provide bulk energy storage when the AC line voltage is low, and are disconnected from ground to remove them from the capacitor input circuit 200 when the input AC line voltage is sufficiently large. As a result, although both the capacitor input circuits 100 (see FIG. 1) and 200 may be employed for a 27 W travel power adapter, the bulk capacitors C32 and C33 are physically smaller than the capacitors C30 and C31.

It is to be noted that although the output voltage of the capacitor input circuit 200 is not a smoothed rectified AC voltage once the switch SW30 opens, a typical flyback converter can accommodate this variation.

In the example of FIG. 2, the reactance of the bulk capacitors C32 and C33 may each be approximately zero. The equivalent series resistance (ESR) of the bulk capacitors C32 and C33 may be the same as the ESR of the capacitors C30 and C31 (see FIG. 1) because ESR is not related to voltage rating. The ESR of the bulk capacitors C32 and C33 with a capacitance of 22 µF may be around 6 ohms, for example. A MOSFET serving as the switch SW30 should be sized to be relatively small compared to the ESR of the bulk capacitors C32 and C33.

In the example of FIG. 2, the sum of the breakdown voltages of the capacitor C32, capacitor C33, and the MOSFET serving as the switch SW30 may be equal to the minimum peak AC line voltage (e.g., 380V), with added margin depending on the particulars of the application.

In the example of FIG. 2, a drain-to-source short on the MOSFET serving as the switch SW30 will expose the bulk capacitors C32 and C33 to the AC line voltage. For safety, a Zener clamp may be placed across the capacitors C32 and C33 (e.g., see FIG. 3, Z30). This ensures that a safety fuse (not shown) of the travel power adapter 110 will blow in the event of a short across the MOSFET. A bias resistor (e.g., FIG. 3, R30) may be added to keep the MOSFET off when the circuit that generates the switch voltage VSW is not operational. Other ways of protecting against a short across the switch SW30 (e.g., using an active clamp, using a different switch configuration) may also be employed.

Figure 3:
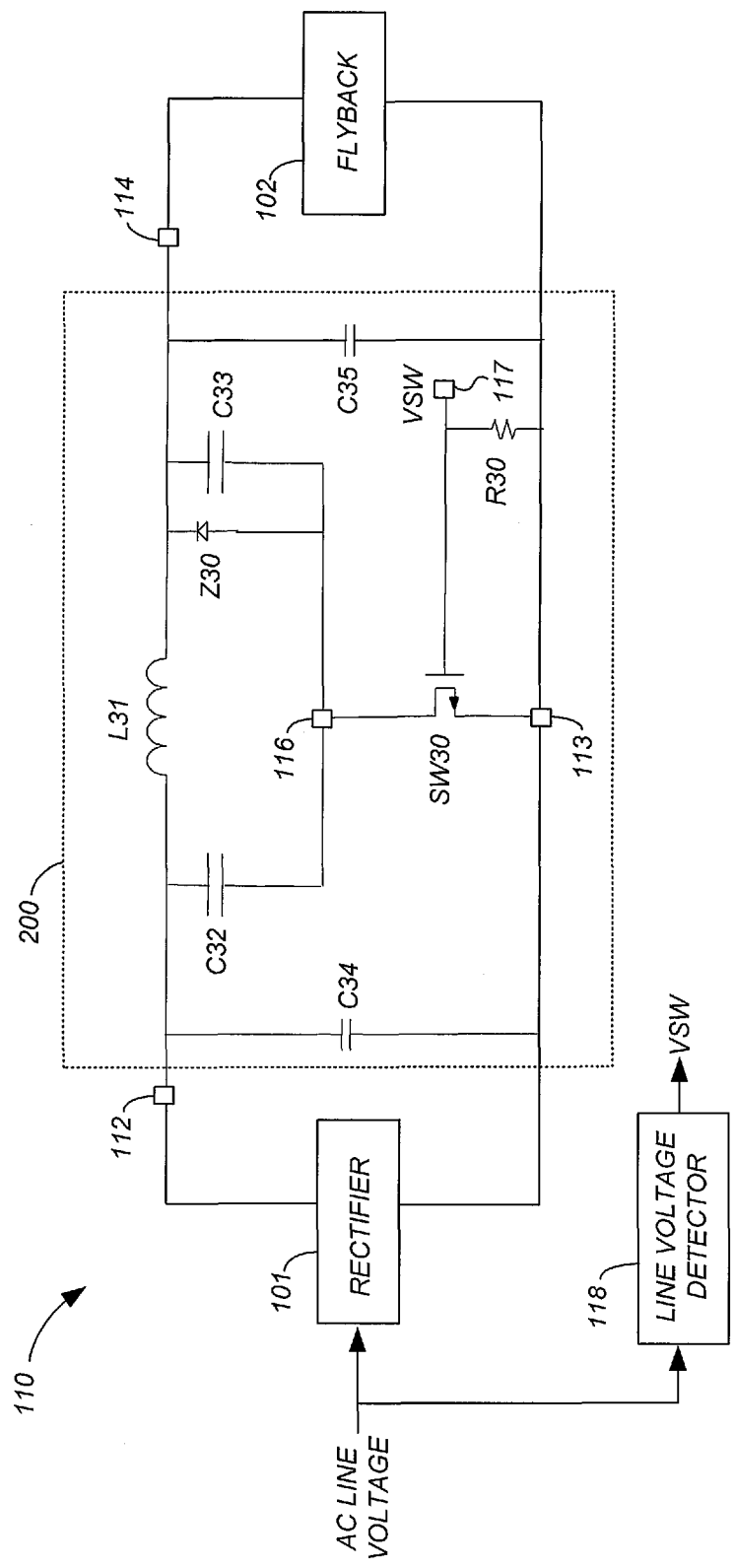
FIG. 3 shows a schematic diagram of the travel power adapter of FIG. 2, with additions to the input circuit for improved safety and EMI filtering, in accordance with an embodiment of the present invention.

FIG. 3 shows a schematic diagram of the travel power adapter 110, with additions to the input circuit 200 for improved safety and EMI filtering, in accordance with an embodiment of the present invention. The input circuit 200 includes the bulk capacitors C32 and C33, inductor L31, and switch SW30 (e.g., MOSFET). In the example of FIG. 3, the capacitor input circuit 200 further includes the Zener diode Z30 and the resistor R30 for safety. The other components shown in FIG. 3 are as previously described.

Because the bulk capacitors C32 and C33 are electrically floating for most input AC line voltages, the bulk capacitors C32 and C33 may not be able to provide adequate EMI filtering. For EMI filtering, multilayer ceramic chip (MLCC) capacitors may be employed to form a pi filter with the inductor L31. Generally speaking, MLCC capacitors are relatively small and inexpensive, and may thus be used as filter capacitors of the capacitor input circuit 200. As an example, a 0.1 µF MLCC capacitor will provide similar reactance at 100 kHz to the ESR of the capacitors C30 and C31 in the travel power adapter of FIG. 1, and may thus perform the same filtering function in the travel power adapter 110 of FIG. 2.

In the example of FIG. 3, filter capacitors C34 and C35 are added to the capacitor input circuit 200 for EMI filtering. In one embodiment, the filter capacitors C34 and C35 are MLCC capacitors. In the example of FIG. 3, the filter capacitors C34 and C35 form a pi filter with the inductor L31. As can be appreciated, the capacitor input circuit 200 may have an EMI filter other than a pi filter, such as a common mode choke or large Y-capacitor filter.

When the AC line voltage is less than the threshold voltage (e.g., 140 VAC), the line voltage detector 118 asserts the switch voltage VSW to turn on the switch SW30. In one embodiment, the switch voltage VSW has a range of 0-5V, and is 5V when asserted and is zero volts when de-asserted. Turning on the switch SW30 connects the bulk capacitors C32 and C33 to ground to hold-up the AC line voltage at low AC line voltages.

When the AC line voltage exceeds the threshold voltage, the line voltage detector 118 de-asserts the switch voltage VSW to turn off the switch SW30. Turning off the switch SW30 disconnects the bulk capacitors C32 and C33 from ground so that they electrically float and are removed from the capacitor input circuit 200, thereby preventing exposure of the bulk capacitors C32 and C33 to high AC line voltages.

Capacitor input circuits for mobile power supplies have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A mobile power supply comprising:
   a rectifier that is configured to rectify an AC line voltage to generate a rectified AC voltage;
   a capacitor input circuit that is connected to an output of the rectifier to receive the rectified AC voltage, the capacitor input circuit comprising a first bulk capacitor, a second bulk capacitor, and a switch that is connected to an end of the first bulk capacitor and to an end of the second bulk capacitor, the switch being configured to connect the first bulk capacitor and the second bulk capacitor to receive the rectified AC voltage when the AC line voltage is lower than a threshold voltage, and to electrically float the first bulk capacitor and the second bulk capacitor and thereby disconnect the first bulk capacitor and the second bulk capacitor from the capacitor input circuit when the AC line voltage is greater than the threshold voltage; and
   a converter that is connected to an output of the capacitor input circuit to receive an input voltage and to convert the input voltage to a regulated output voltage.

2. The mobile power supply of claim 1, wherein the capacitor input circuit further comprises an inductor having a first end that is connected to the first bulk capacitor and a second end that is connected to the second bulk capacitor.

3. The mobile power supply of claim 1, further comprising a Zener diode that is connected across the second bulk capacitor.

4. The mobile power supply of claim 1, further comprising a first filter capacitor that is connected across the rectifier.

5. The mobile power supply of claim 4, further comprising a second filter capacitor that is connected across the converter.

6. The mobile power supply of claim 5, wherein the first and second filter capacitors are multilayer ceramic chip capacitors.

7. The mobile power supply of claim 1, wherein the switch comprises a metal oxide semiconductor transistor.

8. The mobile power supply of claim 7, wherein the capacitor input circuit further comprises a resistor having a first end that is connected to a gate of the transistor and a second end that is connected to ground.

9. The mobile power supply of claim 1, wherein the converter is a flyback converter.

10. A capacitor input circuit for a mobile power supply, the capacitor input circuit comprising:
    a first bulk capacitor;
    a switch that is configured to connect the first bulk capacitor to receive a rectified AC voltage from a rectifier when an AC line voltage that is input to the mobile power supply is lower than a threshold voltage and to electrically float the first bulk capacitor when the AC line voltage is greater than the threshold voltage;
    an inductor having a first end that is connected to a first end of the first bulk capacitor;
    a second bulk capacitor having a first end that is connected to a second end of the inductor and a second end that is connected to a second end of the first bulk capacitor,
    wherein a first electrode of the switch is connected to the second end of the first bulk capacitor and to the second end of the second bulk capacitor, a second electrode of the switch is connected to ground, and
    wherein the switch is configured to connect the second ends of the first and second bulk capacitors to ground when the AC line voltage is below the threshold voltage, and to disconnect the second ends of the first and second bulk capacitors from ground when the AC line voltage is greater than the threshold voltage.

11. The capacitor input circuit of claim 10, wherein the switch comprises a MOSFET.

12. A method of operating a mobile power supply, the method comprising:
    rectifying an AC line voltage that is input to the mobile power supply to generate a rectified AC voltage;
    connecting a first bulk capacitor and a second bulk capacitor to ground to receive the rectified AC voltage when the AC line voltage is lower than a threshold voltage;
    disconnecting, by a switch that is connected to an end of the first bulk capacitor and an end of the second bulk capacitor, the first bulk capacitor and the second bulk capacitor from ground when the AC line voltage is greater than the threshold voltage; and
    converting, by way of a converter, the rectified AC voltage to a regulated output voltage.

13. The method of claim 12, further comprising:
    filtering the rectified AC voltage with a filter comprising a filter capacitor that is across a rectifier that generates the rectified AC voltage.

* * * * *